Figure 1:
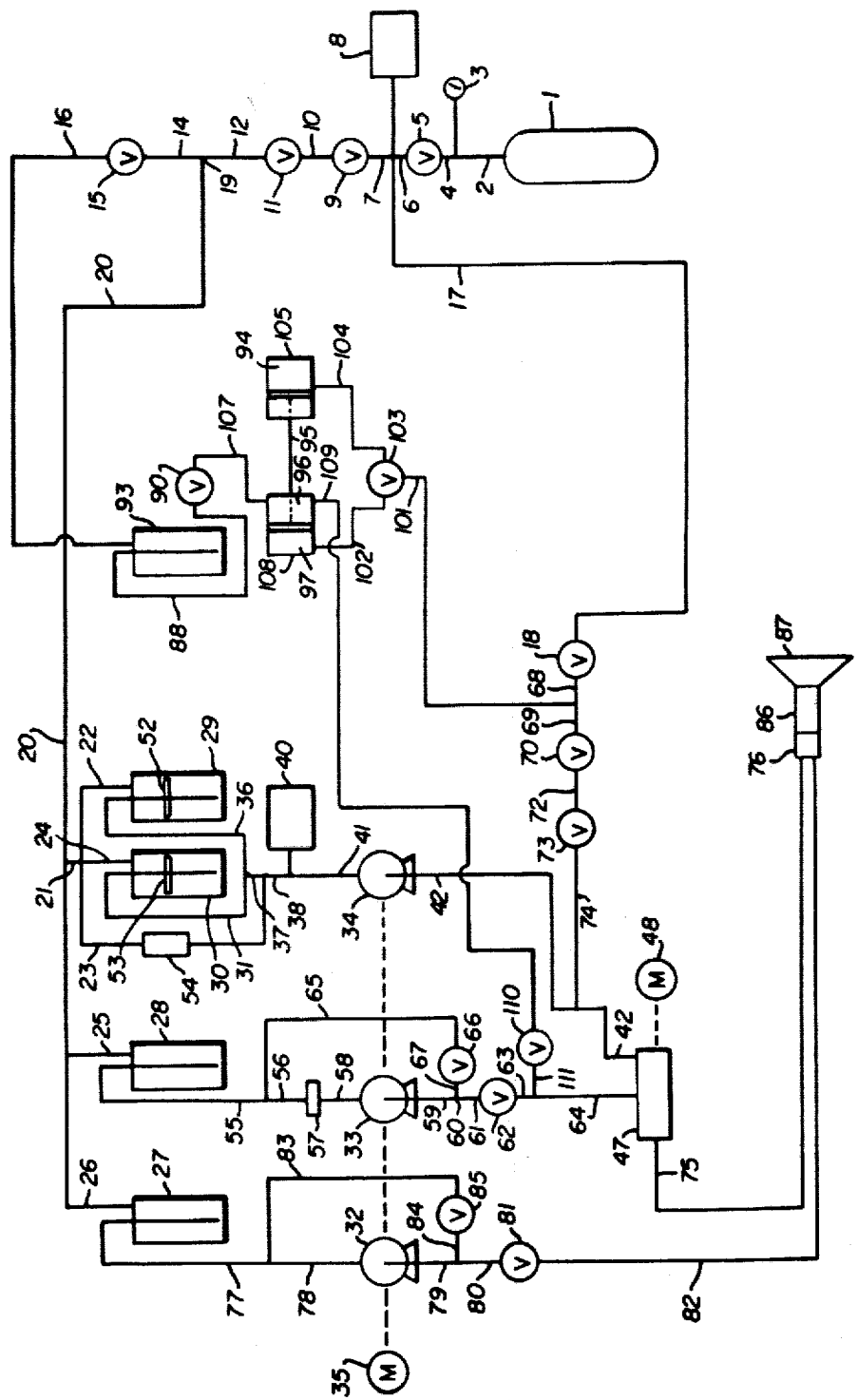

United States Patent [19]

Barth et al.

[11] 4,316,875
[45] Feb. 23, 1982

[54] APPARATUS FOR PRODUCING A CURABLE POLYURETHANE FROTH

[75] Inventors: Bruce P. Barth, Bridgewater; Robert N. Johnson, Basking Ridge; Walter P. Mayer, Lebanon, all of N.J.; Bruce H. W. Pinkston, Cleveland, Ohio

[73] Assignee: Union Carbide Corporation, New York, N.Y.

[21] Appl. No.: 115,628

[22] Filed: Jan. 28, 1980

[51] Int. Cl.³ .................. B29D 27/00; C08J 9/00
[52] U.S. Cl. .................. 422/133; 252/359 E; 261/DIG. 26; 422/135
[58] Field of Search .................. 422/133, 135; 261/DIG. 26; 252/359 E; 366/150; 222/389; 521/133

[56] References Cited

U.S. PATENT DOCUMENTS

| | | | |
|---|---|---|---|
| 3,043,340 | 7/1962 | Rehbock | 222/389 |
| 3,321,110 | 5/1967 | Price | 222/389 |
| 3,476,292 | 11/1969 | Joseph et al. | 252/359 E |
| 3,769,232 | 10/1973 | Houldridge | 252/359 E |
| 3,821,130 | 6/1974 | Barron et al. | 521/133 |
| 4,021,386 | 5/1977 | Lindström | 422/133 X |
| 4,038,037 | 7/1977 | Wilmsen | 422/133 |
| 4,154,377 | 5/1979 | Adams | 222/389 |
| 4,199,547 | 4/1980 | Levinsky et al. | 422/133 |

Primary Examiner—Michael S. Marcus
Attorney, Agent, or Firm—Donald M. Papuga

[57] ABSTRACT

An apparatus for the continuous production of a curable polyurethane froth which apparatus comprises separate sources of a polyol, an isocyanate, a catalyst and an inert gas, means including separate conduits for feeding said polyol, isocyanate and inert gas separately and under pressure at controlled flow rates from said sources to a mixing device containing inlet openings to receive said polyol, isocyanate and inert gas, means for mixing said polyol, isocyanate and inert gas to produce a froth, and an outlet opening for the resulting froth, means for delivering the froth from said mixing device to a second mixing device, a conduit for feeding the catalyst under pressure at a controlled flow rate to the second mixing device, and means for mixing the froth and catalyst, said mixing device containing inlet openings to receive the froth and catalyst and an outlet opening for the resulting catalyzed froth and means for delivering the catalyzed froth from the mixing device onto a substrate.

3 Claims, 2 Drawing Figures

APPARATUS FOR PRODUCING A CURABLE POLYURETHANE FROTH

This invention is directed to an apparatus for the continuous production of a polyurethane froth.

Apparatus for generating foam is well known and has been widely used primarily for applying the foam to textile materials, and the like. The foam composition is applied to the substrate and as it contacts the substrate, the bubbles burst and the composition is absorbed by the substrate.

The foam is generated in an apparatus which generally consists of a mechanical agitator capable of mixing metered quantities of a gas, such as air, and a liquid chemical composition containing the chemical that is to be applied to the substrate, and converting the mixture to a foam.

However, a structurally stable polyurethane froth could not be produced using the foam generating apparatus of the prior art.

U.S. Pat. No. 3,821,130 describes flexible polyurethane foams prepared from inert gas frothed mixtures of a polyether polyol end-capped with at least 2 moles of ethylene oxide per active hydrogen atom, a polyisocyanate-containing material and a catalyst for urethane formation. The polyether polyol and polyisocyanate are employed in quantities so as to provide an NCO:OH ratio of from about 0.85:1 to about 2.0:1. The flexible polyurethane foams produced have densities below about 15 lbs./ft.$^3$.

This patent states that the foams do not require the use of a volatilizing blowing or foaming agent or a silicone oil cell control agent. The foams of the patent are prepared by mechanically inducing the inert gas into the urethane-forming composition producing a froth which is or can be dispensed into a suitable mold or onto a suitable substrate whereupon the frothed mixture sets into a cellular polyurethane product. The patent states that the conventional froth resulting from the mechanical introduction of inert gas into the urethane-forming mixture does not undergo any subsequent significant expansion other than that caused by any thermal expansion of the inert gas employed which is very small, i.e., less than about 1 percent by volume.

The patent, in column 3, describes the various methods of preparing the froth. These methods include mechanically whipping or blending air or other inert gases into the mixture of urethane-forming components with a mixer fitted with a blade designed to mechanically whip the air into said mixture. Another method comprises feeding a stream composed of a mixture of the urethane-forming components or separate streams of the urethane-forming components and a stream of air into a froth generator mixer where the frothed composition which emerges from the mixer is directed into a mold or onto a substrate where the frothed composition thermosets into a flexible polyurethane foam. Still another method described in the patent is to feed the inert gas and all of the urethane-forming components, except for the catalyst, into the froth generator-mixer and subsequently mix the catalyst with the resultant froth in a mixer, such as a static mixer, and then direct the froth into a mold or onto a substrate. In Examples 1 to 13 of the patent, the polyether polyol and isocyanate containing compound are placed into a Hobart mixer equipped with a blade for whipping air into the mixture and whipping at a high rate of speed for a time sufficient to provide a froth, usually two minutes. After the whipping is complete, a catalyst is added and the resulting froth mixed for an additional 45 seconds and then poured into an open container to cure.

However, this patent does not describe apparatus for the continuous production of a froth.

THE INVENTION

This invention is directed to an apparatus for the continuous production of a curable polyurethane froth, which apparatus comprises separate sources of a polyol, an isocyanate, a catalyst and an inert gas, means including separate conduits for feeding said polyol, isocyanate and inert gas separately and under pressure at controlled flow rates from said sources to a mixing device containing inlet openings to receive said polyol, isocyanate and inert gas, means for mixing said polyol, isocyanate and inert gas to produce a froth, and an outlet opening for the resulting froth, means for delivering the froth from said mixing device to a second mixing device, a conduit for feeding the catalyst under pressure at a controlled flow rate to the second mixing device, and means for mixing the froth and catalyst, said mixing device containing inlet openings to receive the froth and catalyst and an outlet opening for the resulting catalyzed froth and means for delivering the catalyzed froth from the mixing device onto a substrate.

It has been found that the apparatus of this invention produces a polyurethane froth which is structurally stable and easily workable at ambient temperatures. The froth has a density of from about 18 to about 45 lbs./ft.$^3$, and preferably, from about 20 to about 35 lbs./ft.$^3$.

The froth foam produced has utility as, for example, an adhesive for bonding panels to framing, particularly for bonding dry wall panels to wooden framing; a flame retardant insulating material; insulating material around doors and windows; patching wood; patching concrete; patching cinder blocks; it can be formed into a temporary walkway or road over soft ground; a highway mediam divider; post hole filler material to eliminate contact of the post with the earth since it provides almost instant support; covering, protecting and insulating wrap for buried piping; a packing material; repair holes, dents in vehicles; a dry wall joint sealer.

The cured cellular polyurethane has an essentially closed cell structure. The cells are essentially spherical and less than about 300 microns in diameter. The cell diameter ranges from about 5 to about 300 microns. The size of the cell which forms the skin surface of the polyurethane foam has a dimension which is essentially equivalent to the size of the cell in the mid-interior of the foam. Thus, from surface to surface, the size of the cells of the polyurethane foam, exclusive of those cells which are adhesively bonded to a substrate and are contiguous thereto, are essentially uniform. Such uniformity is reflective of the average uniformity that one would find in the mid-section of such a polyurethane foam. The density of the cured foam is approximately equal to the density of the froth prior to curing.

The cured polyurethane is resilient, sandable and can be easily decorated.

Figure 2:
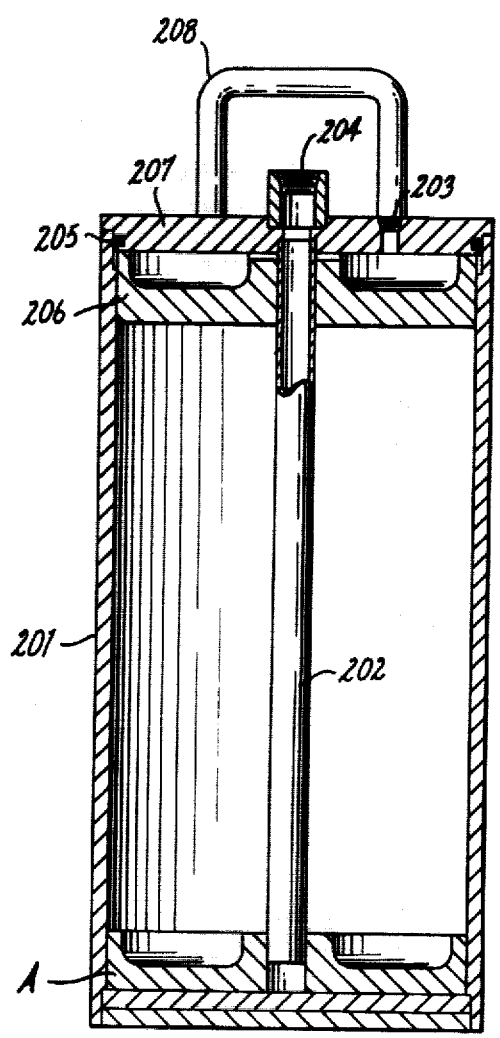

In order to describe more definitively many of the embodiments of this invention, reference is made to FIG. 1 which schematically depicts a flow diagram of a desirable embodiment of this invention, and FIG. 2 which depicts a side view of vessels 29 and 30 of FIG. 1.

In discussing FIGS. 1 and 2 the descriptions are purely illustrative and are not intended to be in any sense limiting. To those skilled in the art to which this invention relates, many changes in construction and different embodiments will suggest themselves without departing from the spirit and scope of the invention.

The polyol package (the polyol package will hereinafter and for purposes of this discussion be referred to as "the polyol") contained in vessels 29 and 30, isocyanate contained in vessel 28 and catalyst contained in vessel 27 are pumped to mixers by pumps 34, 33 and 32, respectively. These pumps are driven by a motor 35. The utilization of a single motor to drive the pumps assures a fixed, constant, ratio of the materials from vessels 27, 28, 29 and 30, since all pumps are of a positive displacement type. The polyol is drawn from vessels 29 and 30 and pumped at a constant rate by pump 34 whose output is fixed to the drive motor speed. The pump may be a Moyno unit (manufactured by Robbins and Meyers Corporation). The output may vary from about 100 to about 200 grams or more per minute by varying the drive speed and sizing the components.

Isocyanate is drawn from tank 28 through line 55 and optionally, through filter 57 which removes any impurities or previously reacted material. Pump 33 may be a gear type unit manufactured by Zenith Corporation, whose output of 30 to 60 g/min. or more is determined by the speed of drive motor 35. This output is carried through lines 59, 61 and 64 and valve 62.

At various times during the froth generation process it may be desirable to discontinue isocyanate flow without interrupting the flow of the other systems. This capability is embodied in valves 62 and 66 and lines 67 and 65. By blocking flow through valve 62 the output of pump 33 reaches a pressure of about 100 psi which causes check valve 66 to open passing fluid through line 65. This fluid is then recirculated through filter 57 and pump 33 until the drive motor 35 is stopped or valve 62 is reopened.

Similarly, catalyst is drawn from tank 27 through line 77, to be pumped and metered by the single piston pump 32. The output flow of from about 0.5 to about 5 g/min. may be recirculated by closing valve 81 which causes flow through lines 84 and 83, when output pressure causes check valve 85 to open automatically.

The chemical supply tanks 27, 28, 29 and 30 are pressurized to minimize the possibility of contamination and reduce the power output requirement of motor 35. This is accomplished by introducing gas from tank 1 through a set of pressure reducing valves 5 and 9 and a control valve, 11, through line 20 to the top of each tank. The chemical fluids thus reach the same pressure as line 20, about 60 psi, to facilitate fluid flow through the inlet lines to each pump thus minimizing the possibility of cavitation and unreliable metering.

Froth generation is accomplished mechanically by a mixer 47, driven by motor 48. Air is drawn from tank 1, through valves 5, 18, 70 and 73 and lines 17, 68 69, 72 and 74, such that a constant flow rate is maintained. This air and the polyol are introduced into the mixer via line 46. Isocyanate is added via line 64 and the polyol and air is mixed and whipped into a froth. Line 64 is of a small diameter to maintain a high fluid velocity and minimize any backflow of reactive material which could cause a blockage.

The urethane froth is delivered by line 75 to a catalyst injector 76. Catalyst flows via line 82 to the catalyst injector. Line 82 is of a small diameter to minimize elastic effects of the line and fluid, enhancing consistent system operation.

The froth with catalyst passes into a static mixer, 86, which blends said components to a uniform homogeneous state. The curable froth may be applied directly to a substrate or may be applied with an applicator 87, whose purpose is to distribute the froth into a preferred configuration.

Specifically, with reference to the FIG. 1, vessel 1 is a source of dry gaseous material, which is preferably dry nitrogen or dry air. Gas from vessel 1 passes through lines 2 and 4 at a pressure of about 2700 psig and then through pressure reducing valve 5 where it is reduced to about 200 psig. A portion of the gas passes via lines 6 and 7 to pressure reducing valve 9 which reduces the pressure to about 60 to 70 psig. The other portion of the gas passes via lines 6 and 17 to pressure reducing valve 18 which reduces the pressure to about 100 to 150 psig. Pressure switch 8 monitors the gas supply level. Gage 3 displays the gas pressure.

The gas from pressure reducing valve 9 passes via line 10 to direction control valve 11, the via lines 12 and 20; a portion goes via line 26 to form pressure on the contents of vessel 27; a portion via line 25 to exert a pressure on the contents of vessel 28; a portion via lines 21 and 22 to exert a pressure on the contents of vessel 29; and a portion via lines 21 and 24 to exert a pressure on the contents of vessel 30.

In an optional embodiment, gas passes from valve 11 via lines 12 and 14 through pressure reducing valve 15 where it is reduced to about 5 psi and flows through line 16 where it exerts a pressure on the contents of vessel 93. The contents of vessel 93 comprise a cleaning or flushing solvent.

When the process is started polyol contained in vessels 29 and/or 30, isocyanate contained in vessel 28 and catalyst contained in vessel 27 are pumped to mixers by pumps 34, 33 and 32, respectively, which mixers are driven by motor 35. Specifically, polyol contained in vessels 29 and 30 pass via lines 36 and 31, respectively, then through lines 37, 38 and 41, through pump 34 and line 42 to mixer 47 which is driven by motor 48. Polyol in vessels 29 and 30 can be used concurrently or sequentially. In a preferred embodiment vessels 29 and 30 contain floating pistons 52 and 53. These pistons help completely empty the vessel especially when a viscous polyol is used. Additionally, the piston cuts off the supply of polyol when a vessel becomes empty so that flow from the second vessel can commence. Pressure switch 54 detects a difference in pressure to indicate that both tanks are empty.

Vessel 40 is a reservoir for polyol. It is a one quart bladder accumulator. When the pumping process is started, the polyol from either vessel flows into accumulator 40 and fills it. When both vessels 29 and 30 are empty of polyol, pressure switch 54 is activated and polyol from vessel 40 flows at reduced pressure into pump 34 and into mixer 47 as previously described, to prevent cavitation during the shutdown sequence.

Isocyanate is pumped into mixer 47 by passing from vessel 28 via lines 55 and 56 optionally through filter 57, via line 58 through pump 33, via lines 59 and 61, valve 62 and lines 63 ad 64. At times, it may be desirable to discontinue the isocyanate flow without stopping the flow of the other components. In this optional system, flow is discontinued by closing valve 62 which causes the output of pump 33 to reach a pressure of about 100 psi which causes valve 66 to open and allows isocyanate to pass through line 65. The isocyanate is then recirculated through filter 57 and pump 33 until motor 35 stops or valve 62 is reopened.

Air is supplied to mixer 47 to produce a froth. Air is supplied from tank 1 to mixer 47 by passing via lines 2 and 4, valve 5, lines 6 and 17, pressure regulator 18, lines 68 and 69, direction control valve 70, line 72, flow regulator 73, line 74 where the air meets with the polyol from line 42 at tee 43, then both materials pass through line 42 into the mixer 47. At the same time isocyanate is flowing into mixer 47, as described, supra.

The froth formed is delivered from mixer 47 to catalyst injector 76 via line 75. The catalyst is delivered to catalyst injector 76 by passing it from vessel 27 through lines 77 and 78 through pump 32, via lines 79 and 80, through valve 81 and via line 82. In an optional embodiment, the catalyst may be recirculated by closing valve 81 which causes flow through valve 85 and lines 83 and 78 when the pressure causes valve 85 to open automatically.

The preferred catalyst injector is described in copending U.S. patent application Ser. No. 115,623, titled "Apparatus for Mixing Chemical Components" filed on Jan. 28, 1980 by B. Pinkston, and assigned to the same assignee as this invention. The apparatus described in said application Ser. No. 115,623 is an apparatus for producing a mixture of chemical components which comprises an elongated housing containing (a) a tube extending there-through having at least one inlet means for supplying at least one component into said tube whereby said components flow from said inlet means to outlet means at the other end of said tube; (b) inlet means for supplying at least one component either reactive with one or more components of (a) or catalyzing the reaction of two or more components of (a), said inlet means in communication with an annular groove within a conical member which receives said component(s), (c) means for distributing said component(s) from the annular groove to a plurality of grooves in said conical member, said grooves directing the component(s) into the flow of the component(s) of (a) in said tube.

Static mixer 86 mixes the catalyst and the froth. The froth can then be deposited onto a substrate by an applicator 87. Applicator 87 can arrange the foam in a preferred configuration.

In an optional embodiment of this invention, a solvent may be used to flush the following: mixer 47; line 64 carrying materials from the isocyanate vessel; line 75 which carries froth from mixer 47; catalyst injector 76; mixer 86; and applicator 87.

Air is passed to vessel 93, to pressurize the solvent therein, from regulator 11 through line 12, tee 19, line 14, regulator 15 which reduces the pressure to about 5 psi as required through line 16 to create a pressure on the contents of vessel 93.

To prepare the solvent flush system for use, air from line 101 is directed by valve 103 into line 104, filling and pressurizing cavity 94 in cylinder 105 (Cylinder 105 has a 2 inch bore). This causes piston rod assembly 95 to move and hence increasing the volume of cavity 96 in cylinder 108. (Cylinder 108 has a 4 inch bore). As that volume is increased, solvent is drawn via line 88, check valve 90 and line 107 filling cavity 96. This system is ready to flush. When it is desired to flush the system, valve 103 is electrically driven to its other position such that the air from line 101 now passes into line 102 to fill and pressurize cavity 97. The pressure exerted in 97 then decreases the volume of cavity 96 causing the solvent contained therein to pass through line 109 through check valve 110 and lines 111 and 64 into mixer 47 which flushes out the reactive materials therein cleaning the mixer and downstream components ultimately existing through applicator 87. Preferred solvents are halogenated hydrocarbons such as methylene chloride, or ketones, such as acetone or methylethylketone.

The total motion for piston rod assembly 95 from end to end is 3 inches.

FIG. 2 is a side view of a vessel, depicted as 29 and 30 in FIG. 1 which is used to hold the polyol package. Tank cylinder 201 is a seven gallon aluminum cylinder containing a top 207 to which handle 208 is attached. The top can be removed and the polyol added thereto. O-rings 205 provide a seal to prevent materials from leaking out between the top and sides of the cylinder. Air inlet 203 receives air under pressure and creates a pressure on piston 206 forcing it against the contents of the vessel and causing the contents to be forced through suction tube 207 through outlet 204 and into the system. When the cylinder has been emptied of its contents, piston 206 is in position A, and seals the system by sealing suction tube 202.

When the catalyst is injected into the froth and then mixed with the froth in a mixer, the time to cure the froth is greatly reduced. Using this technique of catalyzing the froth the major portion of the cure can take place in about 90 seconds in mass and in about 30 to about 50 minutes in a thin layer. Additionally, besides accelerating cure, said catalyst addition preserves the working life of the froth in the hose precluding gelation or building up of highly viscous or gelled material on the wall of the hose. The hose carries the froth from the mixer to the substrate on which it is deposited. Further, it has been found by adding the catalyst post-expansion of the froth is minimized after it has been spread over a substrate, such as a joint formed by the abutting relationship of two wallboards, for example. When isocyanate reacts with moisture producing $CO_2$, postfoaming occurs resulting in an uneven surface. The catalyst addition, as described, results in an accelerated cure as the froth passes through the hose and is applied to the substrate, so that postfoaming is essentially eliminated when polyol(s) with sufficiently low hygroscopicity are used.

The process of preparing a curable froth and a preferable frothable thermosetting polyurethane-forming composition are described in copending U.S. patent application Ser. No. 115,629 titled "A Frothable Polyurethane Composition and a Cellular Foam Produced Therefrom", filed on Jan. 28, 1980 by B. Barth, et al. and assigned to the same assignee as this invention. As described in said application, the curable froth foam is prepared by mixing air or other gaseous substance with the polyol (including thixotrope and one or more optional ingredients), and the isocyanate. Preferably the catalyst is added to the foam produced by mixing the gas, polyol (including thixotrope and one or more optional ingredients) and isocyanate.

Suitable gaseous substances which are employed in the present invention include any gaseous element, compound, or mixture thereof which exists in the gaseous state under standard conditions of temperature and pressure, i.e., 25° C. and one atmosphere, including for example, helium, nitrogen, oxygen, carbon dioxide and air, or mixtures thereof, provided such do not react with or significantly dissolve into any of the urethane forming components. Dry nitrogen or dry air is the preferred gas.

Specifically, in preparing the curable foam, the isocyanate, and the polyol containing thixotrope, and one or more of the optical ingredients are metered separately and in fixed proportions into a mixer, preferably an SKG or Oakes continuous mixer. The gaseous material under pressure may be metered into either the polyol or isocyanate stream or into both or it may be metered directly into the mixer containing the polyurethane forming components. A dense froth is formed in the mixer under a pressure which is above atmospheric pressure and from about 40 to about 150 psig. The froth is then fed from the mixer into a delivery tube. The froth expands in volume (i.e. decreases in density) as the estrained air bubbles expand with decreased pressure as the foam proceeds towards the outlet of the delivery tube. The catalyst is injected into the froth at a point downstream in the delivery tube and dispersed by passing the foam/catalyst mixture through an in-line mixer. The catalyzed froth is then directed onto a substrate.

The preferable composition for use herein and as described in said U.S. patent application Ser. No. 115,629 comprises a frothable thermosetting polyurethane-forming composition in which the density of the cured foam therefrom is essentially the same as the density of the froth composition, when cured such that at least one surface of the forth is exposed to the atmosphere, which composition comprises:

(a) a polyol,
(b) a polyisocyanate,
(c) a thixotroping agent,
(d) an inert gas,
(e) an amount of moisture available for reaction with the polyisocyanate that is less than that amount which would cause the composition to cure to a cellular polyurethane having a density which is not essentially the same density as that of the frothed composition.

The composition includes a catalyst and optionally one or more of the following: a surfactant, a moisture absorbing material, a filler, a flame retardant, a dye, a pigment, or any other ingredient which would introduce an insignificant amount of moisture into the composition.

The composition as described in U.S. patent application Ser. No. 115,629 is preferably used in the form of three "packages", i.e., a polyol package which contains the polyol, thixotrope and one or more of the optional ingredients; an isocyanate package which contains the isocyanate; and a catalyst package which contains a catalyst which catalyzes the urethane forming reaction, and a solvent for the catalyst. An inert gas is added to produce a froth.

Preferred polyols or mixtures of polyols useful in the present invention have the following characteristics: an average hydroxyl number as low as possible and not greater than about 300; a viscosity at 25° C. of less than about 5000, and preferably less than about 2000 centipoise; a functionality of greater than or equal to 2, preferably greater than or equal to 3; a hygroscopicity (the percent weight gain of a 30 gram sample in a 2⅝ × ⅞ inch circular metal dish placed in a humidity chamber at 90 percent relative humidity at 26° C., for 24 hours) of less than about 7, preferably less than about 1.

The polyols include active hydrogen-containing components such as the hydroxyl-terminated polyhydrocarbons (U.S. Pat. No. 2,877,212); hydroxyl-terminated polyformals (U.S. Pat. No. 2,870,097); fatty acid triglycerides (U.S. Pat. Nos. 2,833,730 and 2,878,601); hydroxyl-terminated polyesters (U.S. Pat. Nos. 2,698,838, 2,921,915, 2,591,884, 2,866,762, 2,850,476, 2,602,783, 2,729,618, 2,779,689, 2,811,493, and 2,621,166); hydroxymethyl terminated perfluoromethylenes (U.S. Pat. Nos. 2,911,390 and 2,902,473); British Pat. No. 733,624); polyalkylenearylenecether glycols (U.S. Pat. No. 2,808,391); polyalkyleneether triols (U.S. Pat. No. 2,866,774).

Especially preferred polyhydroxyl-containing materials are the polyether polyols obtained by the chemical addition of alkylene oxides, such as ethylene oxide, propylene oxide and mixtures thereof, to water or polyhydric organic compounds, such as ethylene glycol, propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1,4-diol, 3-cyclohexene-1,1-dimethanol, 4-methyl-3-cyclohexene-1,1-dimethanol, 3-methylene-1,5-pentanediol, diethylene glycol, (2-hydroxyethoxy)-1-propanol,4-(2-hydroxyethoxy)-1-butanol, 5-(2-hydroxypropoxy)-1-pentanol, 1-[2-hydroxyethoxy]-2-hexanol, 1-(2-hydroxypropoxy)-2-octanol, 3-allyloxy-1,5-pentanediol, 2-allyloxymethyl-2-methyl-1,3-propanediol, 3-(o-propenylphenoxy)-1,2-propanediol, 4,4′-isopropylidenebis(p-phenyleneoxy)-diethanol, glycerol, 1,2,6-hexane-triol, 1,1,1-trimethylolethane, 1,1,1-trimethylolpropane, 3-(2-hydroxypropoxy)-1,2-propanediol 2,4-dimethyl-2-(2-hydroxyethoxy)-methylpentanediol-1,5; 1,1,1-tris[(2-hydroxyethoxy)methyl]-ethane, 1,1,1-tris[(2-hydroxyethoxyl)methyl]ethane, 1,1,1-tris[(2-hydroxypropoxy)-methyl]propane, dipropylene glycol, pentaerythritol, sorbitol, sucrose, lactose, alpha-methyl-glucoside, alphahydroxyalkylglucoside, novolac resins, phosphoric acid, benzenephosphoric acid, polyphosphoric acids such as tripolyphosphoric acid and tetrapolyphosphoric acid, ternary condensation-products, caprolactone and the like. The alkylene oxides employed in producing polyoxyalkylene polyols normally have from 2 to 4 carbon atoms. Propylene oxide and mixtures of propylene oxide with ethylene oxide are preferred. The polyols listed above can be used per se as the active hydrogen compound.

A preferred class of polyether polyols employed in this invention can be represented generally by the following formula

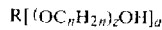

wherein R is hydrogen or a polyvalent hydrocarbon radical; a is an integer (e.g., 1 or 2 to 6 to 8) equal to the valence of R, n in each occurrence is an integer from 2 to 4 inclusive (preferably 3) and z in each occurrence is an integer having a value of from 2 to about 200, preferably from 15 to about 100.

Additional active hydrogen-containing materials are the polymers of cyclic esters having a reduced vicosity value of at least about 0.15, and desirably from about 0.2 to about 15, and higher. The preferred polymers of cyclic esters have a reduced viscosity value of from about 0.3 to about 10. These polymers are homopolymers or copolymers characterized as containing units of the formula:

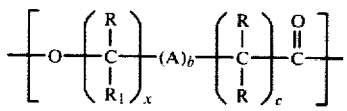

wherein each $R_1$, individually, is hydrogen, alkyl, halo, or alkoxy wherein A is an oxy group where x is an integer from 1 to 4; wherein c is an integer from 1 to 4; wherein b is an integer of zero or one; the sum of x+c+b is at least 4 and not greater than 6; and the total number of $R_1$ groups include methyl, ethyl, isopropyl, n-butyl, sec-butyl, t-butyl, hexyl, chloro, bromo, iodo, methoxy, ethoxy, n-butoxy, n-hexoxy, 2-ethylhexoxy, dodecoxy, and the like. It is preferred that each $R_1$ individually, be hydrogen, lower alkyl, e.g., methyl, ethyl, n-propyl, isobutyl, and/or lower alkoxy, e.g., methoxy, ethoxy, propoxy, n-butoxy, and the like. It is further preferred that the total number of carbon atoms in the $R_1$ substituents does not exceed eight.

In one embodiment, preferred polymers of cyclic esters contain both recurring structural Unit 1 and units of the formula:

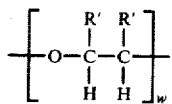

wherein each R', individually, is hydrogen, alkyl, cycloalkyl, aryl, or chloroalkyl, or in which the two R' variables together with the ethylene moiety of the oxyethylene chain of Unit II form a saturated cycloaliphatic hydrocarbon ring having from 4 to 8 carbon atoms, desirably from 5 to 6 carbon atoms and w is an integer of 1 or more, preferably 1 to 10. It is preferred that recurring Unit II contain from 2 to 12 carbon atoms. Illustrative R' variables include methyl, ethyl, n-propyl, isopropyl, t-butyl, the hexyls, the dodecyls, 2-chloroethyl, phenyl, phenethyl, ethylphenyl, cyclopentyl, cyclohexyl, cycloheptyl, and the like. It is preferred that R' be hydrogen; lower alkyl, e.g., methyl, ethyl, n-propyl, isopropyl, chloroalkyl, e.g., 2-chloroethyl; and the like.

The aforedescribed recurring Unit (I) is interconnected through the oxy group (—O—) of one unit with the carbonyl group

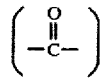

of a second unit, i.e., the interconnection does not involve the direct bonding of two carbonyl groups.

On the other hand, the relatively low molecular weight cyclic ester polymers, e.g., those having reduced viscosity values below about 0.3 are characterized by end groups which can be hydroxyl or carboxyl. Cyclic ester polymers having an average molecular weight of about 500 to about 2000 are preferred for use herein.

The preparation of the cyclic ester polymers is well documented in the patent literature as exemplified by U.S. Pat. Nos. 3,021,309 through 3,021,317; 3,169,945; and 2,962,524. Briefly, the process involves the polymerization of a mixture containing at least one cyclic ester monomer with or without a functional initiator therefor such as the polyols described hereinbefore and in the patents mentioned above, and a suitable catalyst, the choice of which will depend on the presence or absence of added initiator. Suitable cyclic ester monomers which can be employed in the manufacture of the cyclic ester polymers are best illustrated by the following formula:

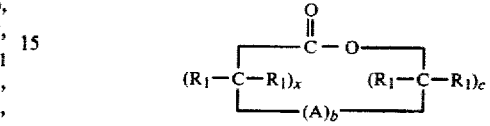

wherein the $R_1$, A, x, c, and b variables have the significance noted in Unit I supra. Representative cyclic ester monomers which are contemplated include, for example, delta-valerolactone; epsilon-caprolactone, zeta-enantholactone; the monoalkyldelta-valerolactones, e.g., the monomethyl-, monoethyl-, monohexyl-, delta-valerolactones, and the like. In the absence of added functional initiator, the polymerization process is desirably effected under the operative conditions and, as noted in U.S. Pat. Nos. 3,021,309 to 3,021,317, in the presence of anionic catalysts. When reacting a mixture containing cyclic ester monomer and functional initiator which possesses at least one active hydrogen substituent, e.g., carboxyl or hydroxyl, it is desirable to use the catalysts noted in U.S. Pat. Nos. 2,878,236, 2,890,208, 3,169,945 and 3,284,417 under the operative conditions discussed therein. Suitable polyol initiators and polycarboxylic acid initiators are those listed in U.S. Pat. No. 3,169,945 and others of the patents enumerated herein as well as those polyols and polycarboxylic compounds listed hereinbefore.

Polymers of cyclic esters can also be manufactured via the process described in U.S. Pat. No. 2,962,524.

Cyclic ester/alkylene oxide copolymers can also be prepared by reacting a mixture comprising cyclic ester and alkylene oxide monomers, an interfacial agent such as a solid, relatively high molecular weight poly(vinylstearate) or lauryl methacrylate/vinyl chloride copolymer (reduced viscosity in cyclohexanone at 30° C. of from about 0.3 to about 1.0), in the presence of an inert, normally liquid, saturated aliphatic hydrocarbon vehicle such as heptane and phosphorus pentafluoride as the catalyst therefor, at an elevated temperature, e.g., about 80° C., and for a period of time sufficient to produce such cyclic ester/alkylene oxide copolymers.

When the cyclic ester polymers are prepared from a mixture containing the cyclic ester monomer and minor amounts of cyclic comonomer which is copolymerizable therewith, e.g., cyclic carbonates and cyclic ethers such as alkylene oxide, oxetane, tetrahydrofuran, etc. the polymeric chain of the resulting copolymeric product will be characterized by both recurring linear Unit I, supra, as well as the recurring linear Unit II (which would represent the alkylene oxide comonomer polymerized therein) and/or by a recurring linear unit which would correspond to the additional polymerizable cyclic comonomer in the monomeric mixture. When the comonomer is an alkylene oxide, the resulting copolymeric product will contain both recurring linear Unit I and recurring linear Unit II in the copolymeric chain thereof. The interconnection of linear Unit I and linear Unit II supra does not involve or result in the direct bonding of two oxy groups, i.e., —O—O—. In other words, the oxy group (—O—) of recurring linear Unit II is interconnected with the carbonyl group

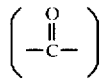

of recurring linear Unit I supra or with the alkylene moiety of a second oxyalkylene Unit (II).

Polymers of cyclic esters as described above are useful in producing polyurethane articles having comparatively high strength and elongation.

As mentioned previously, the polymers of cyclic esters which are contemplated are expressed in terms of their reduced viscosity values. As is well known in the art, reduced viscosity value is a measure or indication of the molecular weight of polymers. The expression "reduced viscosity" is a value obtained by dividing the specific viscosity by the concentration of polymer in the solution, the concentration being measured in grams of polymer per 100 milliliters of solvent. The specific viscosity is obtained by dividing the difference between the viscosity of the solution and the viscosity of the solvent by the viscosity of the solvent. Unless otherwise noted, the reduced viscosity values herein referred to are measured at a concentration of 0.2 grams of polymer in 100 milliliters of solvent (e.g., cyclohexanone, benzene, chloroform, toluene, or other common organic solvents) at 30° C.

Another type of active hydrogen-containing materials useful in this invention are the polymer/polyol compositions obtained by polymerizing ethylenically unsaturated monomers in a polyol as described in British Pat. No. 1,063,222 and U.S. Pat. No. 3,383,351, the disclosures of which are incorporated herein by reference. Suitable monomers for producing such compositions include acrylonitrile, vinyl chloride, styrene, butadiene, vinylidene chloride and other ethylenically unsaturated monomers as identified and described in the above-mentioned British patent and U.S. patent. Suitable polyols include those listed and described hereinabove and in the British patent and U.S. patent. The polymer/polyol compositions can contain from about 1 to about 70 weight percent, preferably about 5 to about 50 weight percent, and most preferably about 10 to about 40 weight percent monomer polymerized in the polyol. Such compositions are conveniently prepared by polymerizing the monomers in the selected polyol at a temperature of 40° C. to 150° C. in the presence of a free radical polymerization catalyst such as peroxides, persulfates, percarbonates, perborates and azo compounds. Further details of the compositions and methods of making same are described in the above-mentioned British patent and U.S. patent. The resulting composition is believed to be a complex mixture comprising free polyol, free polymer and graft polymer/polyol complexes. Preparation 1 of the British patent is especially preferred.

Mixtures of the above active hydrogen-containing compounds can be employed as reactants with the polyisocyanate to form polyurethanes. For example, a mixture of a diol such as propylene glycol, polymer/polyol composition and cyclic ester polymer can be employed.

Other illustrative mixtures include mixtures of polyether polyols: mixtures of polymer/polyol, dipropylene glycol and cyclic ester polymer; mixtures of polyether polyol, dipropylene glycol and polymer/polyol; mixtures of polyether polyol and dipropylene glycol and the like.

Preferably, the polyol is selected from castor oil, polybutadiene polyols and ethylene oxide terminated polyether polyol.

The polyol is used with the isocyanate in amounts that result in an isocyanate index of about 70 to about 150, preferably from about 90 to about 120.

The isocyanates suitable for use in the present invention have the following characteristics: a liquid between about 20° and about 40° C., a viscosity below about 2000 centipoise when measured between about 20° and about 40° C., a functionality of greater than or equal to about 2 (NCO groups per molecule); capable of curing with polyol and catalyst, if used, at about 5° to about 40° C. into a film having a thickness of about 10 mils within about 5 hours with no residual tackiness; compatible with the polyol at temperatures of from about 30° to about 40° C. with mixing in about 10 minutes.

The isocyanates include any suitable polymeric isocyanate composition. This includes mixtures comprising one or more such isocyanates. Illustrative polymeric isocyanates are described in U.S. Pat. No. 2,683,730, issued July 31, 1954 to Seeger et al, the entire disclosure of which is incorporated by reference herein.

Typical polymeric isocyanates are those of the formula as follows:

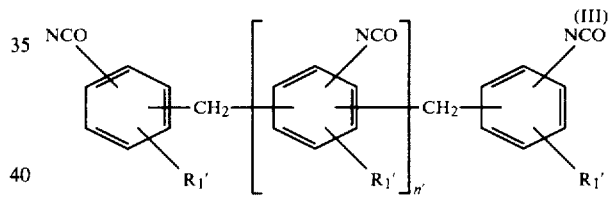

in which $R_1'$ is hydrogen and/or lower alkyl, e.g., methyl, ethyl, propyl and butyl. The preferred polymeric isocyanates as defined by formula III are those in which $n'$ is a number ranging in value from 2.1 to 4.0 and $R_1'$ is hydrogen and/or methyl.

Particularly preferred polymeric isocyanates are the polymethylene polyphenylisocyanates (i.e., those represented by formula III wherein $R_1'$ is hydrogen) which are available commercially under the trademark "PAPI." These are usually supplied in the form of a mixture of polyisocyanates having an average NCO functionability of 2.2–3.5 and more commonly about 2.3–3.0. It is to be understood that the terms "polymeric isocyanate" and "polymethylene polyphenylisocyanate", as used herein are intended to include mixtures containing one or more such polyisocyanates. Further details concerning the polymeric isocyanates and their preparation are provided in the above-noted Seeger et al. patent. Also, suitable for use herein are 2,4- and 2,6-toluene diisocyanate and mixtures thereof. Liquid methylene bis(phenyl isocyanate) as described in U.S. Pat. No. 3,384,653; 4,4'-methylene bis(phenyl isocyanate); 2,4'-methylene bis(phenyl isocyanate); mixtures of 4,4'- and 2,4'-methylene bis(phenyl isocyanate); crude 4,4'-methylene bis(phenyl isocyanate); isomeric xylene diisocyanates and mixtures thereof; isomeric phenylene diisocyanate and mixtures thereof; isomeric naphthalene diisocyanates and mixtures thereof; substituted methylene bis(phenyl isocyanates), wherein the substituents include for example 3-alkoxy, 3,3'-dimethyl and 3,3'-dimethoxy; substituted 2,6-toluene diisocyanates, wherein the substituents include, for example, p-methoxy, p-i-propyl, p-CN, p-methyl, p-CO-alkyl, p-N(alkyl)$_2$; halogenated isocyanates such as, monochloro 2,4-toluene diisocyanate, monochloro 2,6-toluene diisocyanate; terphenyl isocyanates such as: 4,4',4''-triisocyanato meta terphenyl; 4,4'-diisocyanato diphenyl oxide, 4,4'-diisocyanato diphenyl sulfide, 4,4'-diisocyanato diphenyl disulfide, 4,4'-diisocyanato diphenyl ethylene-1,2, 4,4'-diisocyanato naphthalene disulfide, and 4-isocyanato phenyl sulfonyl isocyanate; aliphatic isocyanates such as: 3-isocyanato methyl-3,5,5 trimethyl cyclohexyl isocyanate; 1,6-hexamethylene diisocyanate; 1,4-tetramethylene diisocyanate; 1,4 butylene (-2-) isocyanate; diisocyanato cyclohexane; triisocyanato cyclohexane, norbornane diisocyanates as described in U.S. Pat. Nos. 3,493,330 and 3,470,248; bis(2-isocyanato ethyl) fumarates as described in U.S. Pat. No. 3,579,482; polyoxyalkylene diisocyanates as described in U.S. Pat. No. 3,370,077; dimeric fatty acid diisocyanates as described in U.S. Pat. No. 3,455,883; 1,2-bis(p-(2-isocyanato ethyl) phenyl)-1-isocyanatomethyl ethane as described in U.S. Pat. No. 3,539,611; 1,4-bis(isocyanato)-1-phenyl tetrahydronaphthalene as described in U.S. Pat. No. 3,455,981; hydrogenated aryl isocyanates, such as 2,4-(p-isocyanato cyclohexylmethylene)-1-isocyanato cyclohexane; 4,4'-diisocyanato dicyclohexyl methane; 2,3-bis(difluoroamino)-1,4-diisocyanatobutane; 4,4'-bis(2-isocyanato hexafluoropropyl)diphenyloxide; acylated urea polyisocyanates as described in U.S. Pat. No. 3,383,400; biuret polyisocyanates as described in U.S. Pat. No. 3,350,438; silicon containing polyisocyanates as described in U.S. Pat. No. 3,519,579.

Also, prepolymers derived from: the diisocyanates and the glycols, supra, at mole ratios greater than about 3:1; the diisocyanates and polyols, supra, at NCO:OH mole ratios of about 7:1; the polymeric isocyanates and polydiols, supra, at NCO:OH ratio of about 7:1 or greater may be utilized in this invention.

Polymeric isocyanates are preferred herein since they have low viscosity; low vapor pressure; their compatibility with polyols is satisfactory; they are flame retardant since they have an aromatic structure; they have enhanced rigidity and strength due to the aromatic structure; they are low cost and have low toxicity. More preferred are polymeric isocyanates with high ortho content since they have superior compatibility with polyols and they have improved color over higher para containing polymeric isocyanates.

The isocyanate is used with the polyol in a mole ratio of NCO:OH of from about 0.70:1.50, preferably from about 0.90:1.20.

Any thixotrope can be used in the composition of the present invention such as colloidal silica, hydrogenated castor oil, bentonite clays. The preferred thixotrope is hydrogenated castor oil. The thixotrope is used in amounts of from about 1 to about 15, and preferably, from about 2 to about 10, parts per 100 parts of polyol(s) by weight.

When a catalyst is used in the composition a wide variety of urethane forming catalysts can be used. Preferably, the catalyst has the following characteristics: a high activity for the reaction of isocyanate and organic hydroxyl groups; low activity for the reaction of isocyanate and water; high solubility in polyols; the ability to delay the viscosity increase in bulk after the catalyst is mixed into the froth; its catalytic effect being delayed for a brief time period in the temperature range of about 5 to about 40° C. (delay time of about 30 seconds to about 120 seconds is preferable); high solubility in the diluent.

These catalysts include dialkyl tin carboxylates, such as dibutyl tin dilaurate, dioleate, diacetate, or di-2-ethylhexoate, and the like; dimethyl tin dithiolaurate, stannous octoate, stannous oleate, potassium octoate, potassium acetate, phenyl mercuric propionate, iron (III)-acetyl acetonate, copper (II) acetyl acetonate, zinc octoate, zinc acetate, cobalt (II) acetate, manganese (II) acetate, isopropyl titanate, triacryl isopropyl titanate, lead naphthanate, cobalt naphthanate, bismuth nitrate, ferric (III) chloride, sodium silicate, aluminum acetyl acetonate, zinc acetyl acetonate, nickel (II) acetyl acetonate, methyl titanate and zinc stearate.

Particularly effective catalysts are those with tin-sulfur bonds and include, for example, dibutyl tin sulfide, and the like, and dialkyl tin dithiodialkylidene diesters of the following formula:

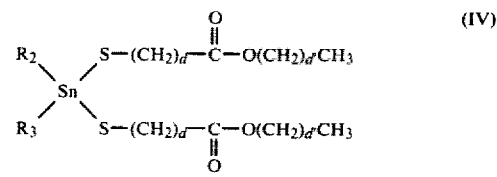

(IV)

Wherein $R_2$ and $R_3$ are independently alkyl, arylalkyl, and alkylaryl containing 1 to about 20 carbon atoms, and d is an integer of 1 to 8 and d' is an integer of from 1 to 10. Preferably, $R_2$ and $R_3$ is alkyl of 1 to 8 carbon atoms and d is an integer of 1 to 4.

Also, tertiary amines may be used as the catalyst. These tertiary amines can be illustrated by the following formula:

(V)

wherein $R_6$, $R_7$, and $R_8$ are independently selected from the group consisting of aryl, alkylaryl, arylalkyl, alkyl, cycloalkyl, alkenyl radicals wherein the aryl, alkylaryl and arylalkyl radicals contain from about 6 to about 20 carbon atoms, the alkyl radicals contain from 6 to 18 carbon atoms, the alkenyl radicals contain from about 3 to 18 carbon atoms, and saturated 5 and 6 membered heterocyclic radicals containing from one to three nitrogen atoms, a' is an integer of from 1 to 5.

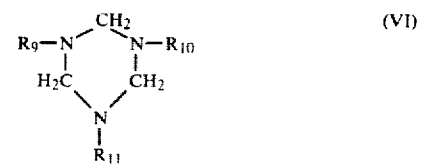

(VI)

Wherein $R_9$, $R_{10}$ and $R_{11}$ are independently selected from

or monofunctional optionally substituted hydrocarbon radicals, with the proviso that at least one of $R_9$, $R_{10}$ or $R_{11}$ is a

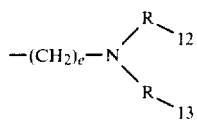

radical wherein $R_9$ and $R_{10}$ are selected from $C_1$ to $C_6$ alkyl, $C_2$ to $C_6$ hydroxyalkyl and e is 0 to 10. As examples of optionally substituted hydrocarbon radicals there may be mentioned morpholinoalkyl; piperidinoalkyl, alkylaminoalkyl; hydroxyalkyl; alkoxyalkyl and alkylcarbonyloxyalkyl. These triazine containing compounds are known in the art as shown for example in U.S. Pat. No. 3,884,917.

The amines suitable for use herein include triethylene diamine, N,N-dimethylcyclohexylamine, triethylamine, N-ethylmorpholine, N-methyl-2,2-dialkyl-1,3-oxazolidines, N-alkylpiperadines, N,N'-dialkypiperazines, tetramethyl-1,3-butane diamine, dimethylethanol amine, bis-dimethylamino diethyl ether, imidazole, N,N', N''-tris(3-dimethylaminopropyl)-S-hexahydrotriazine.

Also, mixtures of the above catalysts can be used.

The catalyst is used in amounts of as little as 0.01 parts by weight, to about 0.50 parts by weight, based on the weight of the polyol(s). The amount of catalyst used depends upon the froth temperature into which the catalyst is injected, the amount and alkalinity of any fillers present, the reactivity of the polyol(s) and the temperature of the substrate to which it is being applied. For example, a catalyst such as a dialkyl tin dithioalkylidene diester is used only in amounts of about 0.1 part when the froth temperature is about 40° C., and the substrate temperature (of a wall panel, for example) is about 25° C. When the froth temperature is lower than about 40° C., and the substrate temperature is lower than about 25° C., then more than 0.1 part and as much as 0.50 parts by weight of the catalyst per 100 parts of polyol(s) can be used.

The catalyst is generally added in a solvent. This solvent may be selected from a wide variety of materials. The solvent may be a polyol, or a polyamine, for example, those described, supra, or a surfactant as described infra, or a plasticizer such as a dialkyl phthalate. Generally, the catalyst is dissolved in from about 10 to about 100 parts of solvent per part of catalyst.

The catalyst can be mixed with the solvent and this mixture added to the froth foam and mixed with the froth foam. When the catalyst is added in this manner it is dissolved in solvent. This represents the preferred method of adding the catalyst. Alternatively, relatively large amounts of catalysts which are insoluble in polyols, such as bismuth-and silicate-containing catalysts, specifically $Bi(NO_3)_3$ and $Na_2SiO_3$, can be mixed with said polyol(s) and solubilized by the subsequent addition of simple glycols such as ethylene glycol, propylene glycol or glycerin, or mixtures thereof. Since the catalyst is not soluble in the polyol no gelation occurs in the hose dispensing the froth. If the catalyst were soluble in the polyol, and it was added to the polyol package, in said large amounts, gelation would in fact occur in the dispensing means and plug it.

The composition of this invention may optionally contain one or more of the following ingredients: surfactant, water scavenger, filler, flame retardant, dyes, pigments, and the like.

The surfactant is preferably an organosilicon copolymer as described in, for example, U.S. Pat. Nos. 3,772,224 and 4,022,722.

Another organosilicon surfactant is a partially cross-linked siloxane-polyoxyalkylene block copolymer and mixtures thereof, wherein the siloxane blocks and polyoxyalkylene blocks are linked by silicon to carbon, or by silicon to oxygen to carbon, linkages. The siloxane blocks are comprised of hydrocarbon-siloxane groups and have an average of at least two valences of silicon per block combined in said linkages. At least a portion of the polyoxyalkylene blocks are comprised of oxyalkylene groups and are polyvalent, i.e., have at least two valances of carbon and/or carbon-bonded oxygen per block combined in said linkages. Any remaining polyoxyalkylene blocks are comprised of oxyalkylene groups and are monovalent, i.e., have only one valence of carbon or carbon-bonded oxygen per block combined in said linkages.

Additionally, conventional organo polysiloxane polyoxyalkylene block copolymers such as those described in U.S. Pat. Nos. 2,834,748, 2,846,458, 2,868,824, 2,917,480 and 3,957,901 can be employed.

A further surfactant which can be used herein is a high molecular weight linear non-hydrolyzable $(AB)_n$ siloxane -polyoxyalkylene block copolymer as described in U.S. Pat. No. 4,022,722, which is incorporated herein by reference.

These block copolymers as described in U.S. Pat. No. 4,022,722 have the following average formula:

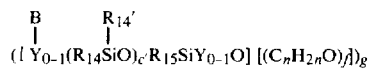

wherein $R_{14}$ and $R'_{14}$ independently represent a monovalent hydrocarbon radical free from aliphatic unsaturation, n is an integer of from 2 to 4 inclusive: c' is an integer of at least 6: f is an integer of at least 4; g is an integer of at least 4: B represents a divalent organic group attached to the adjacent silicon atom by a carbon to silicon bond and to the polyoxyalkylene block by an oxygen atom, with the proviso that one Y group is present in the formula; the average molecular weight of each siloxane block being from about 500 to about 10,000; the average molecular weight of each polyoxyalkylene block being from about 300 to about 10,000; said siloxane blocks constituting from about 20 to about 50 weight percent of the copolymer; the polyoxyalkylene blocks constituting about 80 to about 50 weight percent of the copolymer; and the block copolymer having an average molecular weight of at least about 30,000.

The surfactant can be used in amounts of from 1 to about 10, and preferably, from about 1 to about 4 parts by weight per 100 parts of polyol(s).

The moisture absorbing materials which can be used in this invention include molecular sieves of the zeolite type, silicates, such as ethyl silicates, oxazolidines, carbodiimides, inorganic materials such as magnesium sulfate, calcium sulfate, calcium chloride and any other inorganic salts capable of hydrating with water. Molecular sieves are preferred. The moisture absorbing material can be used in amounts of from about 1 to about 15, and preferably, from about 3 to about 7 parts by weight per 100 parts of polyol(s).

Suitable fillers which can be used include, for example, barium sulfate, calcium carbonate, alumina trihydrate, and the like. Preferably, the filler has low adsorbed moisture. The filler may have a catalytic effect in this invention.

The fillers can be used in amounts up to about 250, and preferably from about 100 to about 200 parts by weight per 100 parts of polyol(s).

When it is desired to prepare cured polyurethane foams having fire retardant properties, fire retardant compounds may be added to the composition. Suitable fire retardant compounds include alumina trihydrate, phosphorus-containing compounds including, for example, tricresyl phosphate and the like, halogenated phosphates including, for example, tris(dichloropropyl)-phosphate.

In the practice of this invention the uncured froth has a density of from about 18 to about 45 lbs./ft.$^3$. The density of the froth is approximately equal to the density of the cellular polyurethane formed.

The ingredients of the composition are so chosen so that the amount of moisture in the composition is less than that amount which would cause the composition to cure to a cellular polyurethane having a density which is not essentially the same density as that of the frothed composition. The composition of this invention forms a cellular polyurethane wherein there is essentially no postblow.

The amount of moisture in the composition can be controlled to be as low as possible by having the ingredients introduce an insignificant amount of moisture into the composition. This is accomplished by, for example, choosing a polyol with an average hydroxyl number as low as possible (a low hygroscopicity) and choosing an isocyanate which is capable of curing with the polyol in as short a time period as possible. A urethane forming catalyst may be added to affect a faster curing rate. If a polyol is chosen which has a high hydroxyl number or a high hygroscopicity, then a moisture absorbing material may be added to the composition. Thus, it can be seen that by correlating the various ingredients, a composition containing a minimum amount of moisture can be achieved.

EXAMPLES

The following examples serve to give specific illustrations of the practice of this invention but they are not intended in any way to limit the scope of this invention.

In the following Examples, the froth was produced by using the apparatus described in FIGs. 1 and 2.

EXAMPLE 1

A polyol package was prepared by mixing in a closed gallon container under a blanket of nitrogen, 57.7 pounds of castor oil, 14.4 pounds of a propylene oxide adduct of an 80/20 mixture of sorbitol and propylene glycol, which polyol has a hydroxyl number of 490, 4.3 pounds of a thixotrope, i.e., hydrogenated castor oil, 0.7 pounds of a surfactant which is of the formula (AB)$_n$ wherein A is a block of dimethylsilicone units, B is a block of oxyalkylene units and n is greater than 20 (hereinafter referred to as surfactant A), and 3.6 pounds of 3 A molecular sieves, 72.1 pounds of alumina trihydrate and 72.2 pounds of 2,2-dichloro-1,3-propanediyl tetrakis(2-chloroethyl) phosphate flame retardant. The ingredients were mixed until the temperature reached 60° C. at which point they were allowed to cool under nitrogen.

The material was then fed to the SKG continuous mixer along with nitrogen under pressure (about 30-70 psi back pressure). The nitrogen was fed into the polyol pipe just prior to the stream entering the continuous mixer. A stoichiometric amount of liquid polymethylene polyphenyl isocyanate was also pumped into the continuous mixer by means of the Zenith metering pump through another pipe. The resulting froth was pumped through an 8 foot long by ½ inch internal diameter hose to a motionless mixer (Stata Tube 20-65, ¾ inch nominal diameter, 22 ½ inch long). Immediately prior to the motionless mixer 5 weight percent of a catalyst which is a dialkyl dimercaptide carboxylic acid ester of the formula

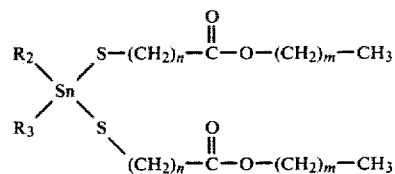

wherein R$_2$ and R$_3$ are —CH$_3$, n equals 2 and m is an integer of from 1 to 10. (UL-24 sold by Witco Chemical Company) in a polyol comprising a propylene oxide adduct of glycerine with a hydroxyl number of 240 was injected by means of a micro-metering pump at a rate to provide 0.1 parts of catalyst per 100 parts by weight of polyol. The catalyst was dispersed in the froth by passing through the motionless mixer. The catalyzed froth was deposited onto a wall board joint and spread over the joint with a steel blade to form a smooth seam. The froth density was 32 lbs./ft.$^3$. The seamed joint was cured vertically at 26° C., and 90% relative humidity. No sagging or postfoaming of the seam occurred. It reached a gelled stage within 33 minutes and within 45 minutes a blade could be drawn over the surface without marring it.

EXAMPLE 2

The procedure of Example 1 was repeated except that the polyol package was made up of the following ingredients:

5400 grams of a polyol comprising a propylene oxide adduct of glycerine with a hydroxyl number of 30 capped with ethylene oxide to give a hydroxyl number of 27;

600 grams of ethylene glycol;

300 grams of hydrogenated castor oil;

300 grams of 3 A molecular sieves; and 60 grams of the surfacant of Example 1.

The froth was produced by the procedure described in Example 1. The froth was deposited onto a wallboard joint and spread over the joint with a steel blade to form a smooth seam. The froth density was 32 lbs./ft.$^3$. The seamed joint was cured vertically at 26° C. and 90% relative humidity. No sagging or postfoaming of the seam occurred. The froth reached a gelled stage within 28 minutes and within 50 minutes a blade could be drawn over the surface without marring it.

What is claimed is:

1. An apparatus for the continuous production of a curable polyurethane froth which apparatus comprises separate sources of a polyol, an isocyanate, a catalyst and an inert gas, said sources being vessels and/or tanks, means including separate conduits for feeding said polyol, isocyanate and inert gas separately and under pressure at controlled flow rates from said sources to a first mixing device containing inlet openings to receive said polyol, isocyanate and inert gas, means for mixing said polyol, isocyanate, and inert gas to produce a froth and an outlet opening for the resulting froth, means for delivering the froth from said first mixing device to an injector means, a conduit for feeding the catalyst under pressure at a controlled flow rate to the injector means, means for injecting the catalyst into the froth, said injector means containing inlet openings to receive the froth and catalyst and an outlet opening for the resulting catalyzed froth, a conduit for delivering the catalyzed froth from the injector means to a second mixing device, means for mixing the catalyzed froth to a uniform homogeneous state, said mixing device containing an inlet opening to receive the catalyzed froth and an outlet opening for the resulting homogenized froth and means for delivering the catalyzed froth from the second mixing device onto a substrate.

2. The apparatus as defined in claim 1 wherein the source of polyol is a container housing a piston which creates pressure on the polyol.

3. The apparatus as defined in claim 1 which includes a source of a solvent and means for feeding said solvent under pressure to the first mixing device.

* * * * *